(12) United States Patent
Kim et al.

(10) Patent No.: US 12,446,497 B2
(45) Date of Patent: Oct. 21, 2025

(54) WIND BLOW TYPE GROUND-BASED CLOUD SEEDING MATERIAL GENERATOR FOR WEATHER MODIFICATION

(71) Applicant: National Institute of Meteorological Sciences, Seogwipo-si (KR)

(72) Inventors: Bu-Yo Kim, Seogwipo-si (KR); Joo Wan Cha, Seogwipo-si (KR); Miloslav Belorid, Seogwipo-si (KR); Minhoo Kim, Gangwan-do (KR); Hyunjun Hwang, Gangwan-do (KR); Hae Jung Koo, Seogwipo-si (KR); Ki-Ho Chang, Seoul (KR)

(73) Assignee: National Institute of Meteorological Sciences, Seogwipo-si (KR)

( * ) Notice: Subject to any disclaimer, the term of this patent is extended or adjusted under 35 U.S.C. 154(b) by 475 days.

(21) Appl. No.: 18/177,507

(22) Filed: Mar. 2, 2023

(65) Prior Publication Data
US 2023/0389486 A1    Dec. 7, 2023

(30) Foreign Application Priority Data
Jun. 3, 2022    (KR) .......................... 10-2022-0067997

(51) Int. Cl.
*A01G 15/00*    (2006.01)
(52) U.S. Cl.
CPC .................... *A01G 15/00* (2013.01)
(58) Field of Classification Search
CPC ...................................................... A01G 15/00
USPC ................................................. 239/2.1, 14.1
See application file for complete search history.

(56) References Cited

U.S. PATENT DOCUMENTS

| | | | | |
|---|---|---|---|---|
| 5,357,865 A * | 10/1994 | Mather | .................. | A01G 15/00 |
| | | | | 239/14.1 |
| 2004/0134997 A1* | 7/2004 | Khain | ..................... | A01G 15/00 |
| | | | | 239/14.1 |
| 2017/0217587 A1* | 8/2017 | Goelet | .................. | B64D 27/353 |
| 2020/0178481 A1* | 6/2020 | Cardi | ..................... | A01G 15/00 |
| 2020/0233115 A1* | 7/2020 | Xue | ......................... | G06F 17/10 |

FOREIGN PATENT DOCUMENTS

| KR | 100679713 B1 * | 2/2007 | ............ A01G 15/00 |
|---|---|---|---|
| KR | 10-1315280 B1 | 10/2013 | |
| KR | 10-2142015 B1 | 8/2020 | |

* cited by examiner

*Primary Examiner* — Steven J Ganey
*Assistant Examiner* — Yelizaveta Y Masalimova
(74) *Attorney, Agent, or Firm* — NKL Law; Jae Youn Kim

(57) ABSTRACT

Provided is a wind blow type ground-based cloud seeding material generator for weather modification, which is capable of perform an experiment for precipitation enhancement through the steps of burning cloud seeding flares on the ground, vertically and horizontally dispersing the seeding materials, and dispersing the seeding material to clouds or fog to grow water drops and ice crystals, and which makes experiment and management easy through effective vertical dispersion of cloud seeding materials.

8 Claims, 5 Drawing Sheets

WIND BLOW TYPE GROUND-BASED CLOUD SEEDING MATERIAL GENERATOR FOR WEATHER MODIFICATION

BACKGROUND OF THE INVENTION

Field of the Invention

The present invention relates to a wind blow type ground-based cloud seeding material generator for weather modification, and more particularly, to a wind blow type ground-based cloud seeding material generator for weather modification, which is capable of perform an experiment for precipitation enhancement through the steps of burning cloud seeding flares on the ground, vertically and horizontally dispersing the seeding materials, and dispersing the seeding material to clouds or fog to grow water drops or ice crystals, and which makes experiment and management easy through effective vertical and horizontal dispersion of cloud seeding materials.

Background Art

Weather modification refers to artificially changing meteorological conditions of a local or regional scale to achieve a goal. There are various methods for such weather modification methods, and precipitation enhancement methods also belong to the weather modification method.

A precipitation enhancement experiment means an experiment for expanding rainfall or snowfall through the steps of spreading cloud seeding materials, such as calcium chloride ($CaCl_2$) or silver iodide (AgI), into the air, growing small water droplets into large water droplets as ice crystal nuclei or condensation nuclei, and developing clouds. When the principle of the weather modification is applied, it is possible to suppress precipitation or dissipate fog on the ground by inducing increased rainfall or increased snowfall in advance when lower cloud or fog occurs.

On the other hand, such precipitation enhancement experiment is classified as an aerial (flight) experiment using meteorological aircrafts, unmanned aerial vehicles, drones, etc., and a ground-based experiment using ground-based cloud seeding material generators. In a case of an aerial experiment, if the meteorological conditions for the experiment are satisfied within the secured airspace, there is an advantage in that effective seeding can be performed in horizontal and vertical positions of clouds or fog, but there is a disadvantage in that it requires lots of human and material resources to run the experiment.

Meanwhile, in a case of a ground-based experiment, the precipitation enhancement experiment can be performed with much less human and material resources, and especially, experiments can be effectively and continuously performed in areas in which meteorological conditions for the experiments are frequently satisfied.

As illustrated in FIGS. 5A-5D, the ground-based experiment for weather modification is performed in a method of burning cloud seeding materials to directly spray the seeding materials to clouds (lower clouds) or fog in accordance with the altitude of an experiment area. In the case of the ground-based experiment, under meteorological conditions with strongly ascending air current, the sprayed seeding materials are dispersed horizontally or vertically to the clouds or fog to effectively grow droplets or ice crystals. However, if not, the downwash phenomenon may occur by horizontal wind or spreading may be blocked by shields, such as trees, buildings, and the like. Therefore, as illustrated in FIGS. 5A-5D, a ground-based cloud seeding material generator is installed at a high place, such as a rooftop, or a tower-type ground-based cloud seeding material generator is installed in order to promote vertical spreading.

However, the conventional ground-based experiments described above has a physical limitation of vertical spreading, and has a problem in that it is inconvenient to perform and manage experiments.

Meanwhile, as a result of investigating the conventional arts related to the present invention, no significant patent documents were found, and the following patent documents were searched in the adjacent technical fields.

Patent literature 1 discloses a cloud seeding flare for ground-based weather modification composition, comprising a cloud seeding material agent, a coagulant, and an additive. The cloud seeding material agent includes potassium perchlorate ($KClO_4$), and the additive includes an epoxy resin. The cloud seeding flare composition is very excellent at fog dissipation efficiency through hygroscopicity.

Patent literature 2 discloses a remote AgI generator for the ground-based cloud seeding comprises a main body in which an ignition tank, a cloud seeding solution tank, and an inert gas tank are installed; at least one ignition unit where the connection pipe of an ignition gas tank and the connection pipe of a cloud seeding solution tank are connected to each other in order to generate the cloud seeding solution; a controller which controls the electronic valve installed in the ignition switch and the connection pipe; and a remote controller remotely controlling the controller. The remote AgI generator for the ground-based cloud seeding can remotely ignite AgI which is a cloud seeding solution to safely perform a precipitation enhancement experiment.

PATENT LITERATURE

Patent Documents

Patent Document 1: Korean Patent No. 10-2142015 B1
Patent Document 2: Korean Patent No. 10-1315280 B1

SUMMARY OF THE INVENTION

Accordingly, the present invention has been made to solve the above-mentioned problems occurring in the prior arts, and it is an object of the present invention to provide a wind blow type ground-based cloud seeding material generator for weather modification, which is capable of perform an experiment for precipitation enhancement through the steps of burning cloud seeding flares on the ground, vertically and horizontally dispersing the seeding materials, and dispersing the seeding material to clouds or fog to grow water drops and ice crystals, and which makes experiment and management easy through effective vertical dispersion of cloud seeding materials.

To accomplish the above object, according to the present invention, a wind blow type ground-based cloud seeding material generator for weather modification is provided and the wind blow type ground-based cloud seeding material generator includes: one or more cloud seeding flares which discharge seeding materials through burning and are equipped with an ignitor disposed at a lower portion; a body formed in a tapered shape so that a diameter of an inlet formed at a lower portion thereof is larger than that of an outlet formed at an upper portion, and having a cloud seeding flare supporter 55 disposed therein to support the cloud seeding flares; a support unit arranged on the bottom surface to support the body; a blowing fan disposed at a lower side of the body to blow air upward; a power supply unit for supplying power to the blowing fan through the lower portion of the body; and a remote controller for firing the ignitor of the cloud seeding flares.

Moreover, the cloud seeding flare supporter is formed in an X-shaped frame structure not to block wind by the blowing fan.

Furthermore, the body has an opening and closing door to install the cloud seeding flare on the cloud seeding flare supporter or detach the cloud seeding flare from the cloud seeding flare supporter.

Additionally, an anti-flame net is installed at the outlet of the body to block fine flames of the burned materials, and a net-type filter is installed at the inlet of the body to block introduction of foreign matters.

In addition, the support unit includes: a support plate having moving wheels disposed at a lower portion thereof; a rotatable supporter of which the upper end portion is rotatably connected to a middle portion of the body to support the body to be rotated in a vertical direction or in a horizontal direction; and a turn table which is installed on the support plate to be rotatable at 360 degrees and on which the rotatable supporter is installed.

Moreover, the power supply unit is a device for supplying power necessary for driving the wind blow type ground-based cloud seeding material generator for weather modification, and supplies power by using a power adaptor, a power generator, or a storage battery using a solar panel.

Furthermore, the cloud seeding flare is installed on the cloud seeding flare supporter as a single flare or a plurality of flares, and the plural cloud seeding flares are burned independently, are burned consecutively, or are burned simultaneously.

In addition, the ignitor of the cloud seeding flare is fired by a smart phone or a PC connected online instead of the remote controller, or is fired by directly manipulating an offline switch.

The wind blow type ground-based cloud seeding material generator for weather modification according to the present invention can perform a weather modification experiment to generate precipitation enhancement by spreading smoke, in which cloud seeding materials are contained, vertically upward by firing cloud seeding flares on the ground or to dissipate fog by spreading smoke in the slope direction or in the horizontal direction. Moreover, wind blow type ground-based cloud seeding material generator can increase the effect of the weather modification experiment and enhance reliability by suppressing backflow or downwash phenomenon of smoke caused by an air current near the ground surface by using the height of the tall body.

In addition, according to the wind blow type ground-based cloud seeding material generator for weather modification, since the cloud seeding flare supporter for supporting the cloud seeding flare is formed in an X-shaped frame structure, wind generated by the blowing fan is not blocked and is discharged through the outlet.

Moreover, according to the wind blow type ground-based cloud seeding material generator for weather modification, since the opening and closing door of the body is positioned on the side of the cloud seeding flare supporter, it is easy to install and separate the cloud seeding flare.

Furthermore, according to the wind blow type ground-based cloud seeding material generator for weather modification, since the filter is installed at the inlet side of the body, malfunction or failure of the blowing fan due to foreign matters is prevented, and the anti-flame net is installed at the outlet side of the body, the risk of fire due to flame dispersing is remarkably reduced.

In addition, according to the wind blow type ground-based cloud seeding material generator for weather modification, since the rotatable supporter and the turntable are provided on the support unit to adjust an inclination angle and rotational angle of the body, smoke containing the seeding materials can be discharged to a desired position.

Moreover, according to the wind blow type ground-based cloud seeding material generator for weather modification, in a case in which a plurality of cloud seeding flares are installed, the flares can be burned in various ways to adjust experimental time and an experimental area.

Furthermore, according to the wind blow type ground-based cloud seeding material generator for weather modification, weather modification experiments can be performed regularly or irregularly in a region requiring fixed or movable experiments according to a power supply type of the power supply unit.

In addition, according to the wind blow type ground-based cloud seeding material generator for weather modification, the ignitor of the cloud seeding flare can be fired at a remote place through the remote controller, or can be fired through a smartphone or a PC connected online, or can be fired by manually operating a switch, thereby improving safety.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, a wind blow type ground-based cloud seeding material generator for weather modification according to the present invention will be described with reference to the accompanying drawings.

Terms to be used in the present invention are defined in consideration of the functions of the present invention, and may differ depending on the intentions of a user or an operator or custom. Accordingly, such wordings should be defined on the basis of the contents of the overall specification.

In addition, the embodiment disclosed hereinafter does not limit the scope of the present invention, but corresponds to merely exemplary terms of constituent elements presented in claims of the present invention, and the embodiments that include replaceable constituent elements as equivalents of the constituent elements defined in the overall specification and claims may be included in the scope of the present invention.

Additionally, optional terms in the following embodiments are used to distinguish one component from another component, and the components are not limited by the terms.

Therefore, in describing the present invention, detailed description of related known technologies that may unnecessarily obscure the gist of the present invention will be omitted.

Figure 1:
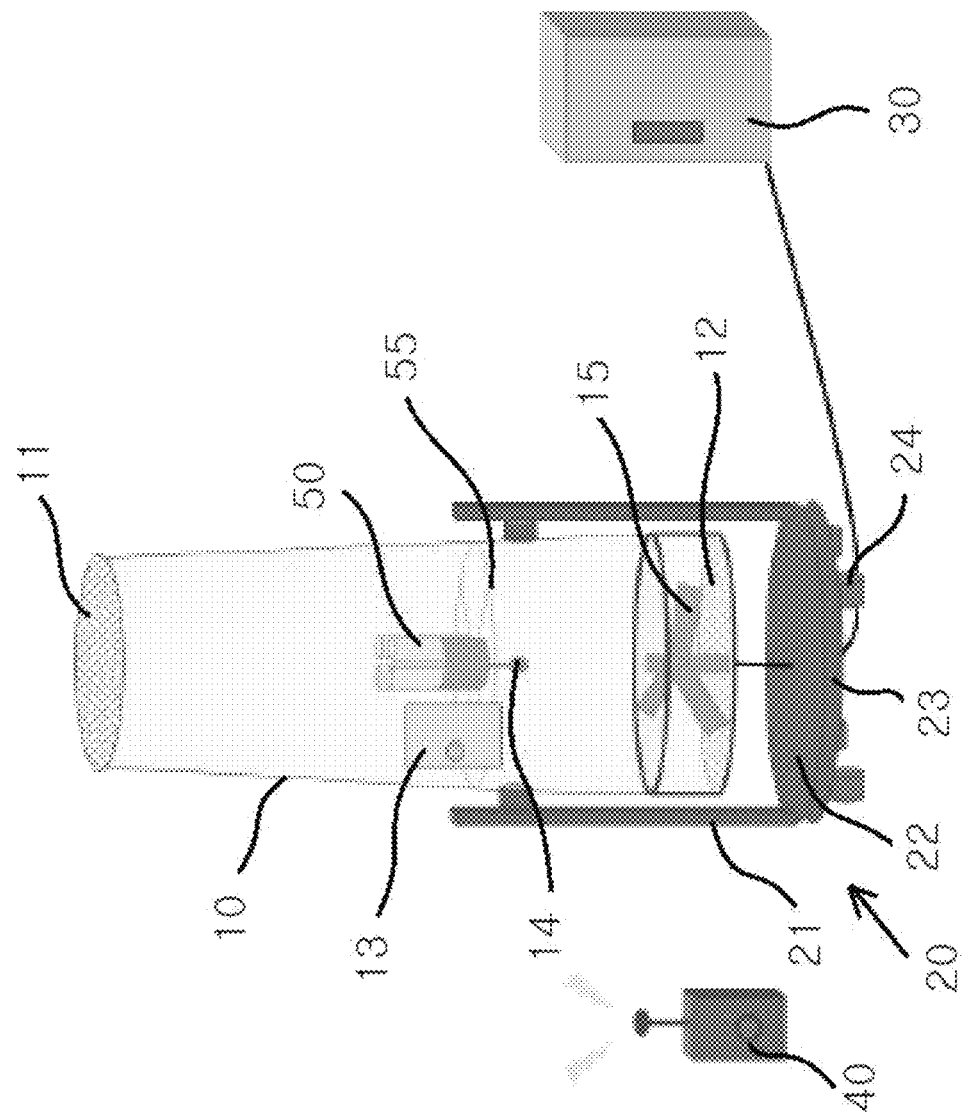
FIG. 1 is a diagram showing a configuration of a wind blow type ground-based cloud seeding material generator for weather modification according to the present invention.
Figure 2:
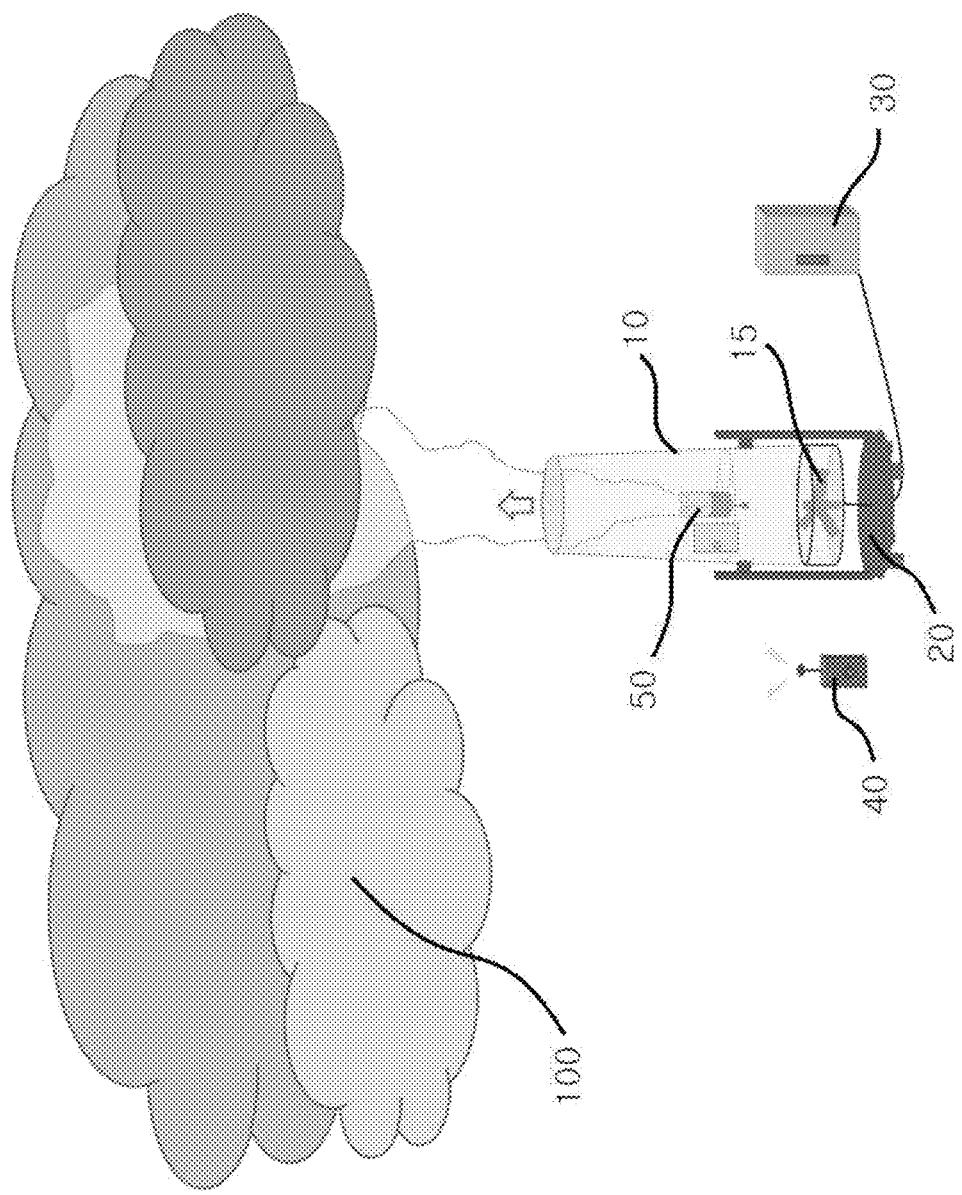
FIG. 2 is a mimetic diagram illustrating a state in which seeding materials are discharged in a vertical direction using the wind blow type ground-based cloud seeding material generator for weather modification according to the present invention.
Figure 3:
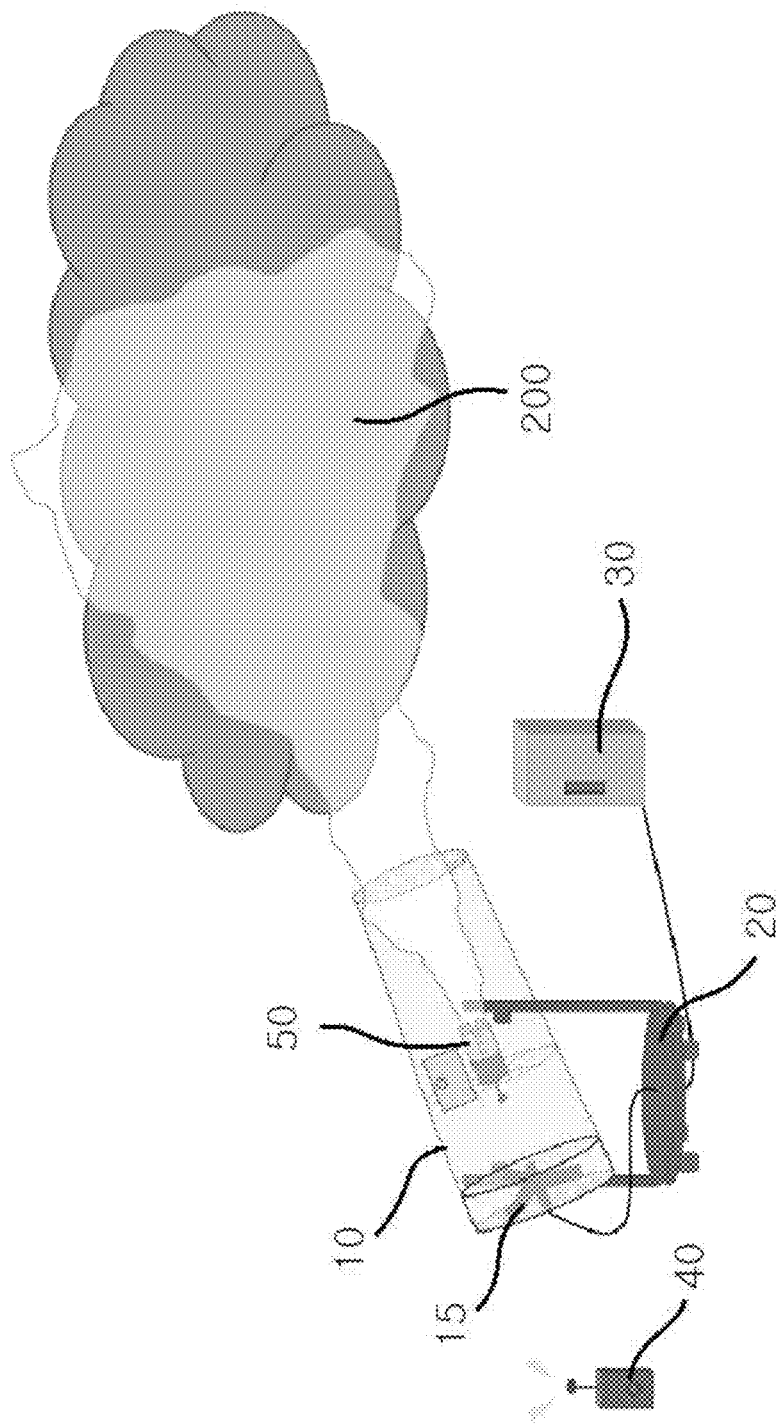
FIG. 3 is a mimetic diagram illustrating a state in which seeding materials are discharged in a vertical direction or in a slop direction using the wind blow type ground-based cloud seeding material generator for weather modification according to the present invention.
Figure 4:
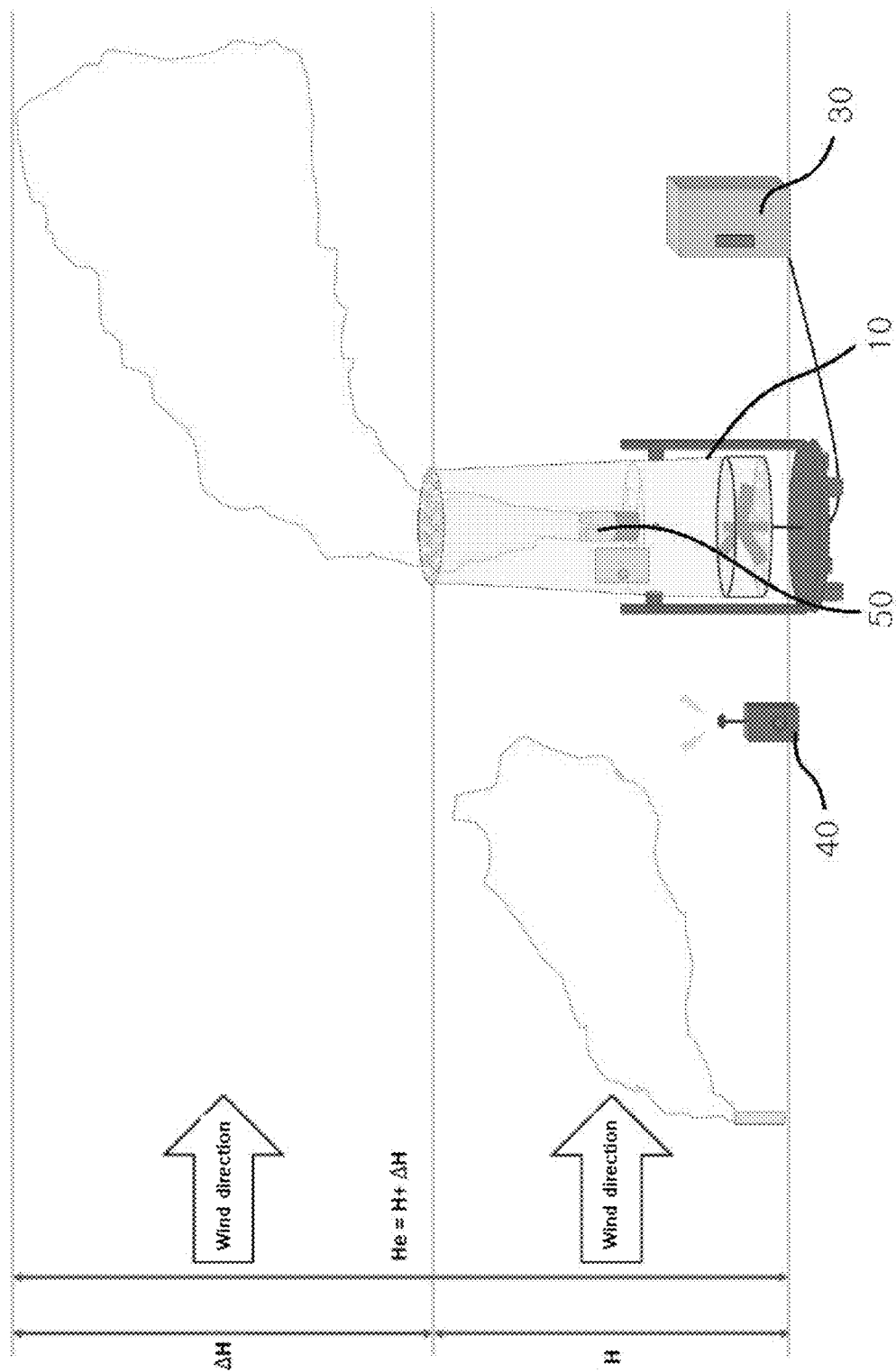
FIG. 4 is a mimetic diagram showing a comparison between a general ground-based weather modification experiment with improved present invention using the wind blow type ground-based cloud seeding material generator for weather modification according to the present invention.
Figure 5B:
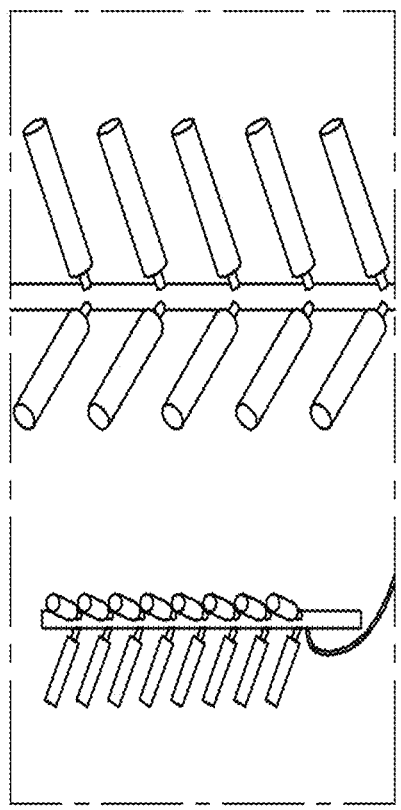
FIGS. 5A-5D are reference drawings for depicting a general ground-based cloud seeding material generation method for weather modification.
Figure 5D:
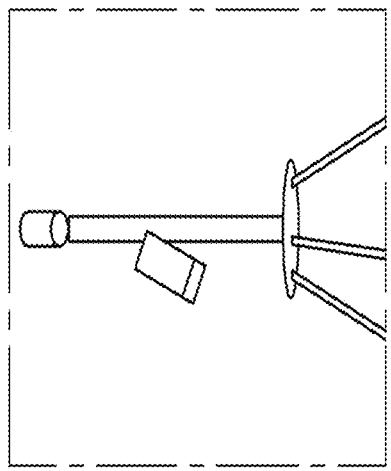
Figure 5A:
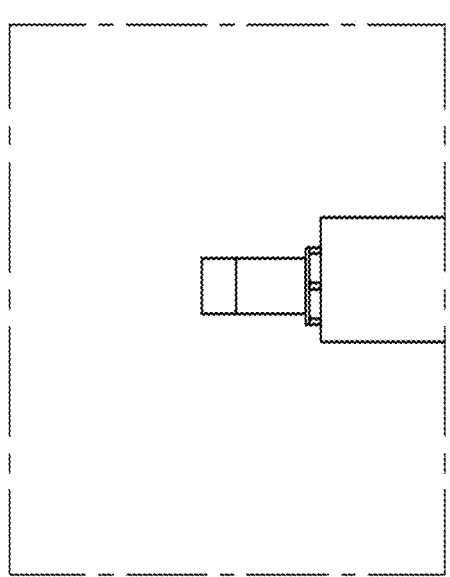
Figure 5C:
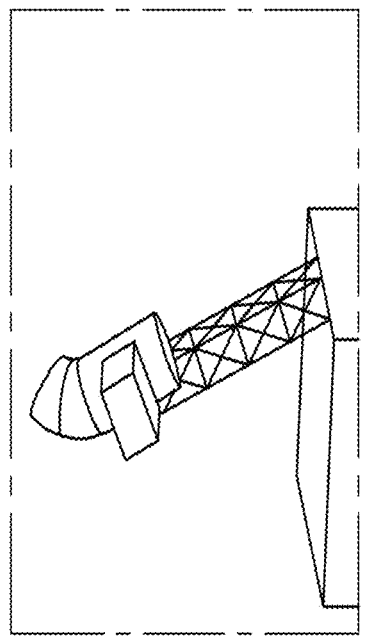

FIG. 1 is a diagram showing a configuration of a wind blow type ground-based cloud seeding material generator for weather modification according to the present invention, FIG. 2 is a mimetic diagram illustrating a state in which seeding materials are discharged in a vertical direction using the wind blow type ground-based cloud seeding material generator for weather modification according to the present invention, FIG. 3 is a mimetic diagram illustrating a state in which seeding materials are discharged in a vertical direction or in a slop direction using the wind blow type ground-based cloud seeding material generator for weather modification according to the present invention, and FIG. 4 is a mimetic diagram showing a comparison between a general ground-based weather modification experiment with improved present invention using the wind blow type ground-based cloud seeding material generator for weather modification according to the present invention.

As illustrated in FIGS. 1 to 4, the wind blow type ground-based cloud seeding material generator for weather modification according to the present invention includes a body 10 having a blowing fan 15, a support unit 20, a power supply unit 30, a remote controller 40, and cloud seeding flare 50.

The body 10 has a cloud seeding flare supporter 55 disposed therein to support the cloud seeding flare 50, and the blowing fan 15 disposed on the inner lower end thereof 15 to generate wind. Here, a diameter of an outlet of the body 10 is larger than a diameter of an inlet of the body in order to increase discharge speed and to increase effective rise height of seeding materials.

Moreover, the body 10 has an opening and closing door 13 to install the cloud seeding flare 50 on the cloud seeding flare supporter 55 or detach the cloud seeding flare 50 from the cloud seeding flare supporter 55. A net-type filter 12 is installed at the inlet of the body 10 to block introduction of foreign matters, and an anti-flame net 11 is installed at the outlet of the body 10 to block fine flames of the burned materials.

Accordingly, the cloud seeding flares 50 can be installed in the body 10 or removed from the body 10 by using the opening and closing door 13, and the filter 12 blocks introduction of foreign matters, so the blowing fan 15 can be operated smoothly. The anti-flame net 11 blocks fine flames so as to prevent outbreak of fire.

The support unit 20 is arranged on the bottom surface to support the body 10, and includes: a support plate 23 having moving wheels 24 disposed at a lower portion thereof; a rotatable supporter 21 of which the upper end portion is rotatably connected to a middle portion of the body 10 to support the body 10 to be rotated in a vertical direction or in a horizontal direction; and a turn table which is installed on the support plate 23 to be rotatable at 360 degrees and on which the rotatable supporter 21 is installed. Accordingly, the rotatable supporter 21 rotates the body 10 within an allowable range so as to discharge the seeding materials upward in the vertical direction or discharge them in the horizontal direction and in a slope direction. Additionally, the rotatable supporter can rotate the body at 360 degrees in a forward direction to adjust a discharge direction of the seeding materials.

The power supply unit 30 is to supply power to the blowing fan 15 through the lower portion of the body 10, and is connected to the blowing fan 15 in a state in which a power line droops downward.

In addition, the remote controller 40 is to fire an ignitor of the cloud seeding flare 50, and includes a signal transmitting unit to transmit a firing signal to a signal receiving unit 14 to fire the ignitor of the cloud seeding flare 50. Therefore, the ignitor of the cloud seeding flare can be fired through the remote controller 40 at a remote place. Moreover, the ignitor of the cloud seeding flare 50 may be fired by a smart phone or a PC connected online instead of the remote controller 40, or fired by directly manipulating an offline switch. However, in a case in which a user directly manipulates the switch, it is preferable to provide a delay circuit on the ignitor so that the user can evacuate to a safe zone.

The cloud seeding flare 50 has the ignitor disposed at the lower portion thereof, and one or more cloud seeding flares are installed on the cloud seeding flare supporter 55. Additionally, the plural cloud seeding flares 50 installed on the cloud seeding flare supporter 55 may be burned independently, burned consecutively, or burned simultaneously. In this instance, the cloud seeding flare supporter 55 is preferably formed in an X-shaped frame structure not to block wind by the blowing fan 15. The signal receiving unit 14 for receiving the firing signal of the remote controller 40 may be disposed at a portion in which the cloud seeding flares 50 is received. Moreover, cloud seeding materials, such as calcium chloride ($CaCl_2$) or silver iodide (AgI), are contained in smoke generated by burning of the cloud seeding flares 50.

Now, how to do weather modification using the wind blow type ground-based cloud seeding material generator according to the present invention will be described as follows.

In a case in which a precipitation enhancement experiment is performed by vertically spreading seeding materials to clouds in the air above an experiment area, as illustrated in FIG. 2, the support unit 20 is manipulated such that the body 10 stands in the vertical direction. The opening and closing door 13 of the body 10 is opened, one or more cloud seeding flares 50 are installed on the cloud seeding flare supporter 50, and then, the opening and closing door 13 is closed to seal. Furthermore, the ignitor of the cloud seeding flare 50 is fired by the remote controller 40, and at the same time, the blowing fan 15 is operated so that air is discharged through the outlet formed at the upper side of the body 10. In this instance, the filter 12 is installed at the inlet of the body 10 to block introduction of foreign matters, thereby preventing malfunction or failure of the blowing fan 15. The anti-flame net 11 is installed at the outlet of the body 10 to block flames of burning materials, thereby preventing a fire.

Referring to FIG. 4, how to obtain an effective rise height of seeding materials will be described with reference to an Equation 1 below.

$$He=H+\Delta H \quad \text{[Equation 1]}$$

$$\Delta H=1.5\text{*discharge speed/wind speed}(m/s)\text{*diameter }(m)$$

$$\text{Discharge speed}(m/s)=\text{wind quantity}(m^3/s)/\text{cross sectional area}(m^2)$$

For example, when the wind speed is 3 m/s and the atmosphere is stable, the wind quantity of the blowing fan 15 is 7.85 $m^3/s$ (28260 $m^3$/hour). In a case in which the radius of the inlet is 0.5 m, and the height H of the body 10 is 5 m, if the cross-sectional area of the outlet of the device is reduced by a half of the cross sectional area of the inlet, the effective rise height He of the seeding material (smoke) becomes 12 m.

That is, in a case in which the air volume of the blowing fan 15 and the radius of the inlet are substituted into the Equation 1, since the discharge speed becomes 20 m/s and the radius of the outlet becomes 0.35 m, the rise height (ΔH) of the seeding materials (smoke) becomes 1.5*20/3*0.7 and 7 m. Therefore, the effective rise height (ΔH) of the seeding materials (smoke) discharged from the body 10 becomes 12 m.

For reference, since the discharge speed is 20 m/s and the rise height (ΔH) of the seeding materials (smoke) becomes 5 m in a case in which the cross sectional area of the outlet is not reduced, the effective rise height (ΔH) of the seeding materials (smoke) discharged from the body 10 becomes 10 m.

Meanwhile, in a case in which an experiment is performed in actual atmosphere, seeding materials can rise to still higher altitude by unstable atmosphere or ascending current. However, in a case in which the discharge speed is lower than 1.5 times the wind speed, since the downwash phenomenon that the seeding materials do not ascend by the wind speed in the air but spread to surrounding area may occur, the wind speed must be considered when an experiment is performed.

In addition, in a case in which the seeding materials are spread to fog or low cloud 200 located around the experiment area so that smoke is vanished, as illustrated in FIG. 3, an experiment is performed in a state in which the support unit 20 makes the body 10 face an area in which clouds or fog are formed, and the body 10 is arranged in a slope direction or a horizontal direction.

Although the present invention has been described and illustrated with reference to several embodiments for illustrating the technical idea of the present invention, the present invention is not limited to the above-described configuration and operation, and it will be understood by those skilled in the art that multiple changes and modifications can be made to the present invention without departing from the scope of the technical idea set forth in the description of the invention. Accordingly, all such appropriate changes and modifications and equivalents should be considered to fall within the scope of the present invention.

What is claimed is:

1. A wind blow type ground-based cloud seeding material generator for weather modification, comprising:

one or more cloud seeding flares which discharge seeding materials through burning and are equipped with an ignitor disposed at a lower portion;

a body formed in a tapered shape so that a diameter of an inlet formed at a lower portion thereof is larger than that of an outlet formed at an upper portion, and having a cloud seeding flare supporter disposed therein to support the cloud seeding flares;

a support unit arranged on the bottom surface to support the body;

a blowing fan disposed at a lower side of the body to blow air upward;

a power supply unit for supplying power to the blowing fan through the lower portion of the body; and a remote controller for firing the ignitor of the cloud seeding flares.

2. The wind blow type ground-based cloud seeding material generator according to claim 1, wherein the cloud seeding flare supporter is formed in an X-shaped frame structure not to block wind by the blowing fan.

3. The wind blow type ground-based cloud seeding material generator according to claim 1, wherein the body has an opening and closing door to install the cloud seeding flare on the cloud seeding flare supporter or detach the cloud seeding flare from the cloud seeding flare supporter.

4. The wind blow type ground-based cloud seeding material generator according to claim 1, wherein an anti-flame net is installed at the outlet of the body to block fine flames of the burned materials, and wherein a net-type filter is installed at the inlet of the body to block introduction of foreign matters.

5. The wind blow type ground-based cloud seeding material generator according to claim 1, wherein the support unit comprises: a support plate having moving wheels disposed at a lower portion thereof; a rotatable supporter of which the upper end portion is rotatably connected to a middle portion of the body to support the body to be rotated in a vertical direction or in a horizontal direction; and a turn table which is installed on the support plate to be rotatable at 360 degrees and on which the rotatable supporter is installed.

6. The wind blow type ground-based cloud seeding material generator according to claim 1, wherein the power supply unit is a device for supplying power necessary for driving the wind blow type ground-based cloud seeding material generator for weather modification, and supplies power by using a power adaptor, a power generator, or a storage battery using a solar panel.

7. The wind blow type ground-based cloud seeding material generator according to claim 1, wherein the cloud seeding flare is installed on the cloud seeding flare supporter as a single flare or a plurality of flares, and the plural cloud seeding flares are burned independently, are burned consecutively, or are burned simultaneously.

8. The wind blow type ground-based cloud seeding material generator according to claim 1, wherein the ignitor of the cloud seeding flare is fired by a smart phone or a PC connected online instead of the remote controller, or fired by directly manipulating an offline switch.

* * * * *